(12) United States Patent  (10) Patent No.: US 7,773,171 B2
Kim et al. (45) Date of Patent: Aug. 10, 2010

(54) DISPLAY APPARATUS AND METHOD OF MANUFACTURING THE SAME

(75) Inventors: Joo-Young Kim, Suwon-si (KR); Jong-Ho Won, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 941 days.

(21) Appl. No.: 11/471,357

(22) Filed: Jun. 20, 2006

(65) Prior Publication Data
US 2007/0046852 A1 Mar. 1, 2007

(30) Foreign Application Priority Data
Aug. 24, 2005 (KR) .................. 10-2005-0077661

(51) Int. Cl.
*G02F 1/13357* (2006.01)

(52) U.S. Cl. .................. 349/58; 349/70; 349/149; 362/97.2

(58) Field of Classification Search .................. 349/58, 349/61, 65, 149, 70, 187; 361/679.26, 679.27; 362/631, 632, 633, 634, 97.2, 217.09
See application file for complete search history.

(56) References Cited

U.S. PATENT DOCUMENTS

| 6,862,053 | B2 * | 3/2005 | Lee et al. ............... 349/58 |
| 2003/0011736 | A1 * | 1/2003 | Ha et al. ............... 349/149 |
| 2006/0103776 | A1 * | 5/2006 | Park ............... 349/58 |

FOREIGN PATENT DOCUMENTS

| CN | 1344960 | 4/2002 |
| CN | 1384387 | 12/2002 |
| CN | 1607426 | 4/2005 |

* cited by examiner

*Primary Examiner*—Dung T Nguyen
*Assistant Examiner*—Tai Duong
(74) *Attorney, Agent, or Firm*—F. Chau & Associates, LLC

(57) ABSTRACT

A display apparatus includes a light providing unit generating light, a display unit displaying an image using the light generated by the light providing unit, a driving unit driving at least one of the light providing unit and the display unit, and a bottom chassis receiving the light providing unit, the bottom chassis having a driving unit receiving recess that receives the driving unit.

19 Claims, 5 Drawing Sheets

DISPLAY APPARATUS AND METHOD OF MANUFACTURING THE SAME

CROSS-REFERENCE TO RELATED APPLICATION

This application claims priority to Korean Patent Application No. 2005-77661 filed on Aug. 24, 2005, the contents of which are herein incorporated by reference in their entireties.

BACKGROUND OF THE INVENTION

1. Technical Field

The present disclosure relates to a display apparatus and more particularly, to a display apparatus capable of enhancing assemblage convenience by removing a shield case for protecting a control printed circuit board, and a method of manufacturing the display apparatus.

2. Discussion of the Related Art

A liquid crystal display (LCD) apparatus can display an image by using optical and electrical characteristics of liquid crystal. The optical and electrical characteristics of the liquid crystal include, for example, refractive index anisotropy or dielectric constant anisotropy. The LCD apparatus is lighter, thinner, uses low driving voltage and consumes less power as compared to other displays such as, for example, a cathode ray tube (CRT) or a plasma display panel (PDP).

The LCD apparatus includes a display unit comprising, for example, an LCD panel displaying an image, and a source printed circuit board (PCB) for driving the LCD panel. The LCD apparatus further includes a light-providing unit that provides the display unit with light, and a bottom chassis receiving the light providing unit and the display unit.

The LCD apparatus further includes a control PCB outputting a control signal for controlling the display unit. The control PCB can be connected to the source PCB through, for example, a flexible printed circuit (FPC). The control PCB can be disposed on a back face of the bottom chassis.

The LCD apparatus further includes a shield case for protecting the control PCB. The shield case can be disposed on the back face of the bottom chassis. The shield case for protecting the control PCB and for blocking electromagnetic fields can be combined with the bottom chassis through, for example, a gasket.

Therefore, costs for manufacturing the LCD apparatus may increase and assemblage convenience may be lowered due to the shield case and the gasket.

SUMMARY OF THE INVENTION

An exemplary embodiment of the present invention provides a display apparatus, which does not include a gasket used in combination with a shield case and a method of manufacturing thereof.

According to an embodiment of the present invention, a display apparatus comprises a light providing unit generating light, a display unit displaying an image using the light generated by the light providing unit, a driving unit driving at least one of the light providing unit and the display unit, and a bottom chassis receiving the light providing unit, the bottom chassis having a driving unit recess that receives the driving unit.

The bottom chassis may comprise a bottom plate for supporting the light-providing unit, and sidewalls facing side portions of the light-providing unit, wherein the driving unit recess is formed at the bottom plate.

A portion of the bottom plate can be recessed to form the driving unit receiving recess.

The driving unit may correspond to a control printed circuit board including a first connector for electrically connecting the control printed circuit board to the display unit.

The driving unit receiving recess may have a first opening portion exposing the first connector.

The control printed circuit board may comprise a second connector for electrically connecting the control printed circuit board to an external main board.

The driving unit receiving recess may have a second opening portion exposing the second connector.

The driving unit receiving recess may have a hole through which the control printed circuit board is combined with a screw.

The display unit may comprise a display panel disposed over the light-providing unit to display an image, and a source printed circuit board for driving the display panel.

The source printed circuit board can be disposed at the sidewalls of the bottom chassis.

The light providing unit may comprise a plurality of lamps arranged in parallel with each other on the bottom plate of the bottom chassis, an optical member disposed over the lamps, and a light reflecting plate disposed under the lamps.

The driving unit may correspond to an inverter board that provides the lamps with driving voltages, the inverter board being disposed behind the bottom plate.

The bottom chassis may comprise an inverter receiving recess receiving the inverter board.

The display apparatus may further comprise a top chassis combining sidewalls of the bottom chassis to fasten the display unit to the bottom chassis.

According to an embodiment of the present invention a method of manufacturing a display apparatus comprises combining a control printed circuit board with a circuit board receiving recess of a bottom chassis, disposing a light providing unit in a receiving space of the bottom chassis, disposing a display unit over the light providing unit, and combining a top chassis with the bottom chassis to fasten the display unit to the bottom chassis.

The method may further comprise connecting a flexible circuit board electrically connected to the source printed circuit board to the first connector through the first opening portion.

The method may further comprise combining an inverter board with the bottom chassis.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE EXEMPLARY EMBODIMENTS

Exemplary embodiments of the present invention will be described below in more detail with reference to the accompanying drawings. The present invention may, however, be embodied in many different forms and should not be construed as limited to the embodiments set forth herein.

Figure 1:
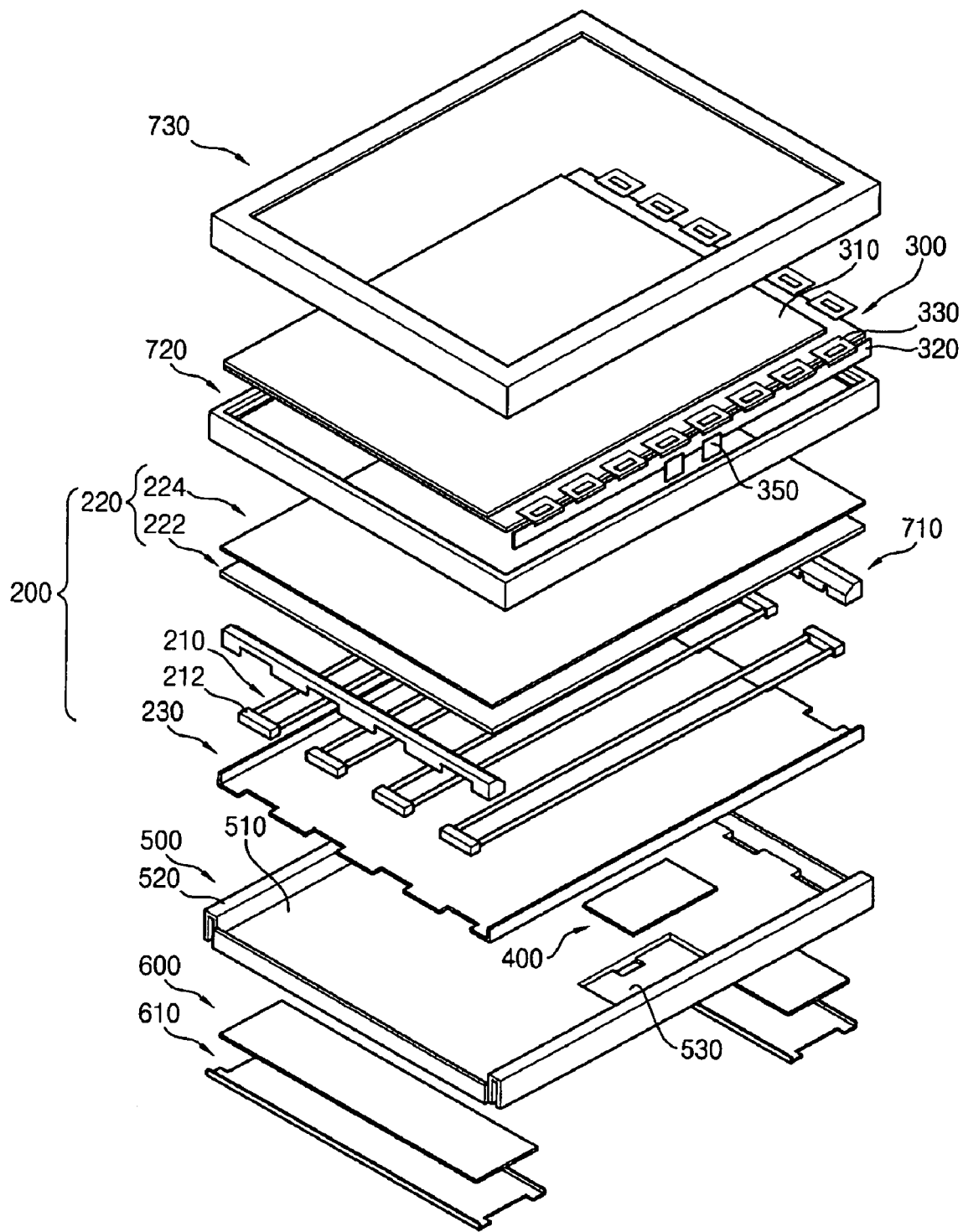
FIG. 1 is an exploded perspective view illustrating a display apparatus according to an embodiment of the present invention.
Figure 2:
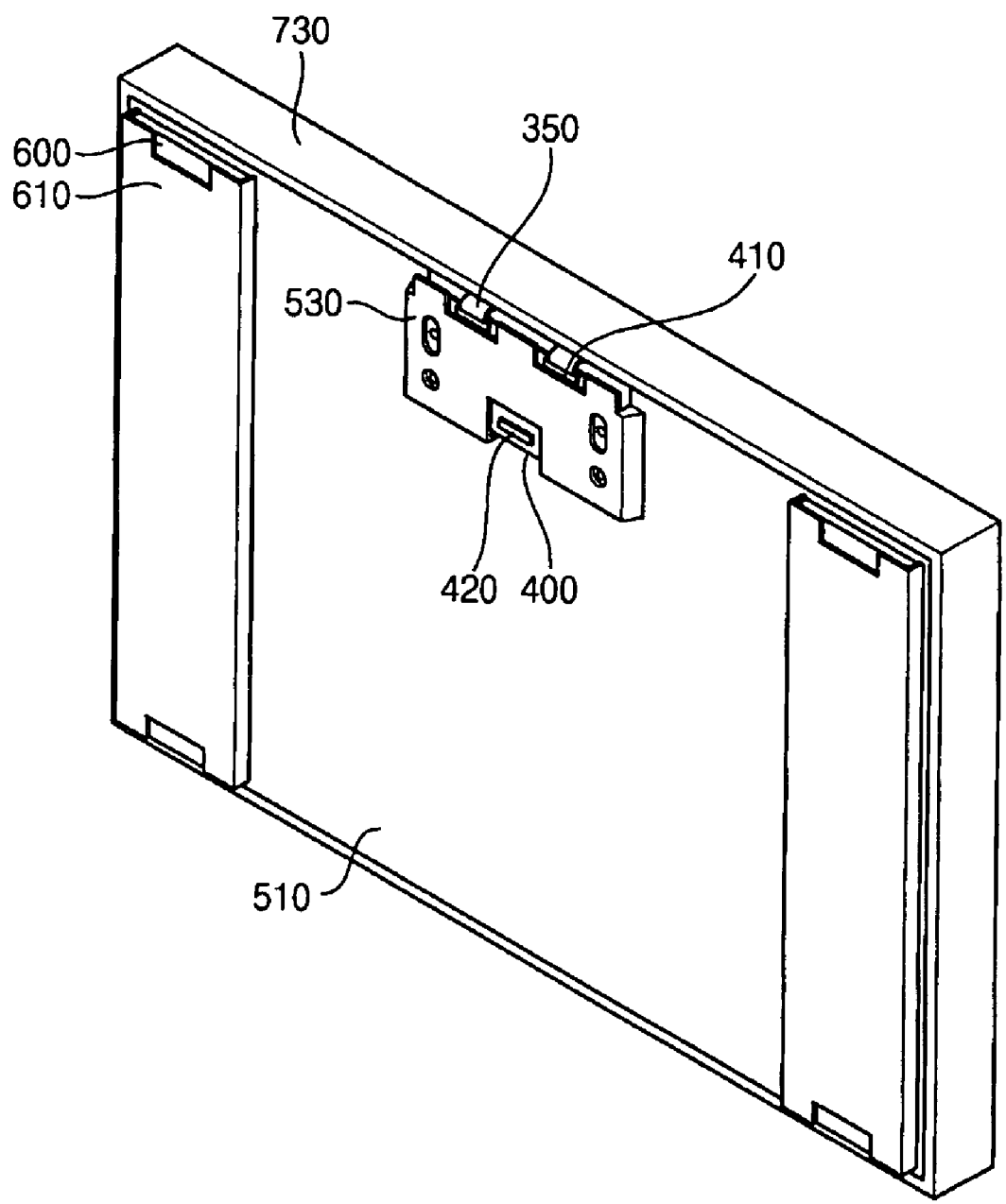
FIG. 2 is a perspective view illustrating a rear side of the display apparatus 1; according to an embodiment of the present invention.

FIG. 1 is an exploded perspective view illustrating a display apparatus according to an embodiment of the present invention. FIG. 2 is a perspective view illustrating a back side of the display apparatus according to an embodiment of the present invention.

Referring to FIGS. 1 and 2, a display apparatus 100 includes a light providing unit 200, a display unit 300, a control printed circuit board (PCB) 400 and a bottom chassis 500.

The light-providing unit 200 provides the display unit 300 with light. The display unit 300 is disposed over the light-providing unit 200. The display unit displays an image by using the light provided by the light-providing unit 200. The control PCB 400 outputs various control signals for controlling the display unit 300. The bottom chassis 500 receives the light-providing unit 200. The bottom chassis 500 includes a circuit board receiving recess 530 receiving the control PCB 400.

The bottom chassis 500 includes a bottom plate 510 supporting the light providing unit 200, and sidewalls 520 surrounding the light-providing unit 200. The bottom chassis 500 includes, for example, metal having a high strength and a low degree of deformation.

In an embodiment of the present invention, the sidewalls 520 are upwardly extended from edge portions of the bottom plate 510 to define a receiving space. A cross-section of the sidewalls 520 may have, for example, a U-shape for combining other elements and for enhancing combination force.

The circuit board receiving recess 530 can be disposed on a back face of the bottom plate 510 of the bottom chassis 500. For example, the circuit board receiving recess 530 protrudes from the back face of the bottom chassis 500 to receive the control PCB 400. In this embodiment, a front face of the bottom chassis 500 refers to a side facing the display unit 300. In other words, a portion of the bottom plate 510 is recessed to form the circuit board receiving recess 530.

The control PCB 400 is disposed at the circuit board receiving recess 530. The control PCB 400 generates various control signals for controlling the display unit 300.

The control PCB 400 includes a first connector 410 for connecting to the display unit 300. The control PCB 400 further includes a second connector 420 for connecting to a main board (not shown) disposed outside the display apparatus. The control PCB 400 outputs control signals for controlling the display unit 300, based on various signals provided by the main board.

The light providing unit 200 includes a plurality of lamps 210 disposed on the bottom plate 510 of the bottom chassis 500 in parallel with each other, an optical member 220 disposed over the lamps 210, and a light reflecting plate 230 disposed under the lamps 210.

The lamps 210 receive electric power from an inverter board 600 disposed on an outer face, e.g. the back face, of the bottom chassis 500 to generate light. For example, a cold cathode fluorescent lamp (CCFL) having a cylindrical shape may be employed as the lamps 210. A distance between the lamps 210 can be adjusted to provide uniform luminance. Different numbers of lamps 210 may be used to adjust luminance.

The light-providing unit 200 may further include a plurality of lamp holders 212 that fasten the lamps 210 to the bottom chassis 500. End portions of the lamps 210 are inserted into holes of the lamp holders 212, respectively, and the lamp holders 212 are fastened to the bottom chassis 500. For example, two adjacent lamps 210 are inserted into each of the lamp holders 212.

In an embodiment of the present invention, the lamps 210 may have a U-shape. An external electrode fluorescent lamp (EEFL) having an electrode formed on an external surface of a lamp tube may be employed as the lamps 210.

In an embodiment of the present invention, the light-providing unit 200 may include a plurality of light emitting diodes (LEDs) or a flat fluorescent lamp (FFL) emitting planar light.

The optical member 220 is disposed over the lamps 210 to enhance optical characteristics of light generated by the lamps 210. The optical member 220 includes a light diffusing plate 222 to diffuse light, and at least one optical sheet 224 disposed on the light diffusing plate 222.

The light diffusing plate 222 diffuses light generated by the lamps 210 to enhance luminance uniformity. The light diffusing plate 222 has a plate-shape having a predetermined thickness. The light diffusing plate 222 is disposed so that the diffusing plate 222 is spaced apart from the lamps 210.

The light diffusing plate 222 includes an optically transparent material for transmitting light. The light diffusing plate 222 may further include a diffusing member (not shown). The diffusing plate 222 includes, for example, polymethyl methacrylate (PMMA).

The optical sheet 224 can adjust a path of light diffused by the light diffusing plate 222 to enhance optical characteristics. The optical sheet 224 may include, for example, a prism sheet that condenses light towards a front direction to enhance front-view luminance.

The optical sheet 224 may include a light-diffusing sheet (not shown) that diffuses light that is already diffused by the light diffusing plate 222 to enhance luminance uniformity. The light-providing unit 200 may include various kinds of optical sheets in accordance with required optical characteristics.

The light reflecting plate 230 is disposed under the lamps 210 to reflect light generated by the lamps 210 toward the display unit 300 to enhance light using efficiency.

The light reflecting plate 230 includes a material having high reflectivity. The light reflecting plate 230 includes, for example, a white colored material such as, for example, polyethylene terephthalate (PET) or polycarbonate (PC). Alternatively, a plate having metal such as, for example, aluminum (Al) coated thereon may be employed as the light reflecting plate 230.

The light reflecting plate 230 is disposed on the bottom plate 510 of the bottom chassis 500, so that the light reflecting plate 230 covers the circuit board receiving recess 530. The light reflecting plate 230 prevents foreign substances from flowing into the circuit board receiving recess 530 through an opening of the circuit board receiving recess 530.

The display unit 300 is disposed over the light-providing unit 200. The display unit 300 displays an image by using light provided by the light-providing unit 200. The display unit 300 includes a display panel 310 that displays an image, and a source PCB 320 that drives the display panel 310.

The display panel 310 is disposed over the optical member 220 to display an image. The source PCB 320 is electrically connected to the display panel 310 through a data driving circuit film 330. The data driving circuit film 330 can be bent, so that the source PCB 320 is disposed at one of the sidewalls 520 of the bottom chassis 500.

The source PCB 320 is electrically connected to the control PCB 400 through a flexible circuit film 350. A first end portion of the flexible circuit film 350 is connected to the source PCB 320, and a second end portion of the flexible circuit film 350 is connected to the first connector 410 of the control PCB 400. Therefore, the control signals generated by the control PCB 400 may be transferred to the source PCB 320 through the flexible circuit film 350.

The display apparatus 100 further includes the inverter board 600 generating a driving voltage for driving the lamps 210. The inverter board 600 converts a low voltage provided from outside into a high voltage for driving the lamps 210, and the inverter board 600 outputs the high voltage.

The inverter board 600 is disposed on a back face of the bottom plate 510 of the bottom chassis 500. Two inverter boards 600 can be disposed at first and second end portions of the bottom plate 510, respectively. Alternatively, only one inverter board 600 may be disposed at one of the first and second end portions of the bottom plate 510, which correspond to end portions of the lamp 210.

The inverter board 600 is protected by a shield case 610. The shield case covers the inverter board 600 and is combined with the bottom chassis 500. The shield case 610 protects the inverter board 600 and electrically shields the inverter board 600.

Although not shown in FIGS. 1 and 2, an inverter receiving recess that receives the inverter board 600 may be formed at the bottom plate 510 of the bottom chassis 500. The inverter receiving recess is extended from the bottom plate 510 toward the outside of the display apparatus like the circuit board receiving recess 530. In other words, a portion of the bottom plate 510 is recessed to form the inverter receiving recess. When the inverter receiving recess is formed at the bottom chassis 500, the shield case 610 may be removed.

The display apparatus 100 further includes side molds 710 disposed at end portions of the lamps 210, respectively. The side molds 710 cover first and second end portions of the lamps 210, to prevent the first and second end portions of the lamps 210 from being exposed outside the display apparatus, and to fix the lamps 210. The side molds 710 cover the first and second end portions of the lamps 210, where the electrodes of the lamps 210 are formed to uniformize luminance. The side molds 710 support and guide the optical member 220 that is disposed over the side molds 710.

The display apparatus 100 may further include a mold frame 720 combined with the bottom chassis 500 to fasten the optical member 220 to the bottom chassis 500. The mold frame 720 compresses the edge portions of the optical sheet 224 and is combined with the sidewalls 520 of the bottom chassis 500. When a size of the display apparatus 100 increases, the mold frame 720 may be formed to have more than one, such as, two or four pieces.

The display apparatus 100 may further include a top chassis 730 that fastens the display unit 300 to the mold frame 720. The top chassis 730 can be combined with the bottom chassis 500 to fix edge portions of the display panel 310. When the top chassis 730 is combined with the bottom chassis 500, the data driving circuit film 330 can be bent, so that the source PCB 320 is disposed between the sidewalls 520 of the bottom chassis 500 and the top chassis 730. The top chassis 730 may include, for example, metal having high strength and a low degree of deformation.

Figure 3:
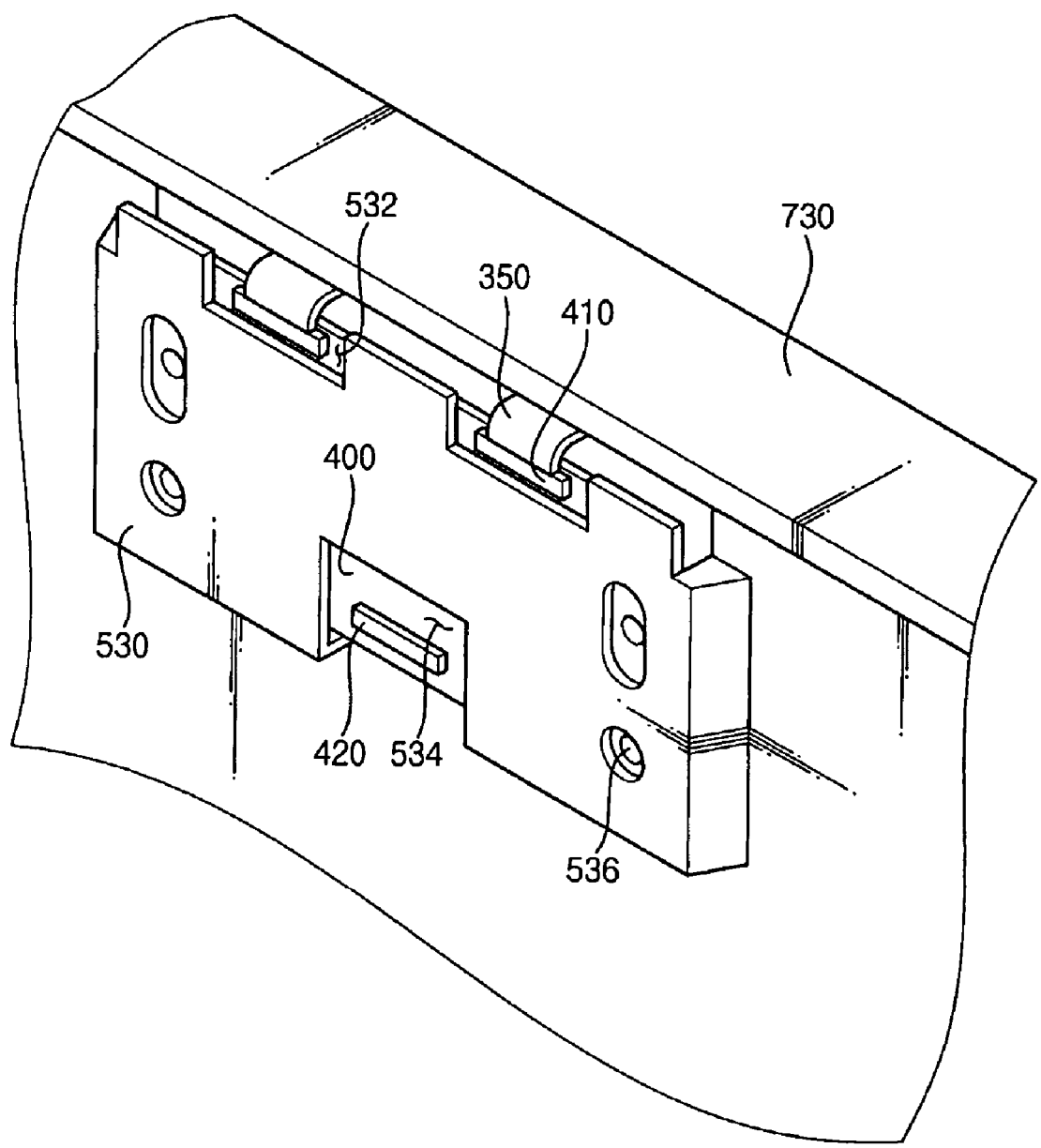
FIG. 3 is an enlarged view illustrating a portion of circuit board receiving recess in FIG. 2.
Figure 4:
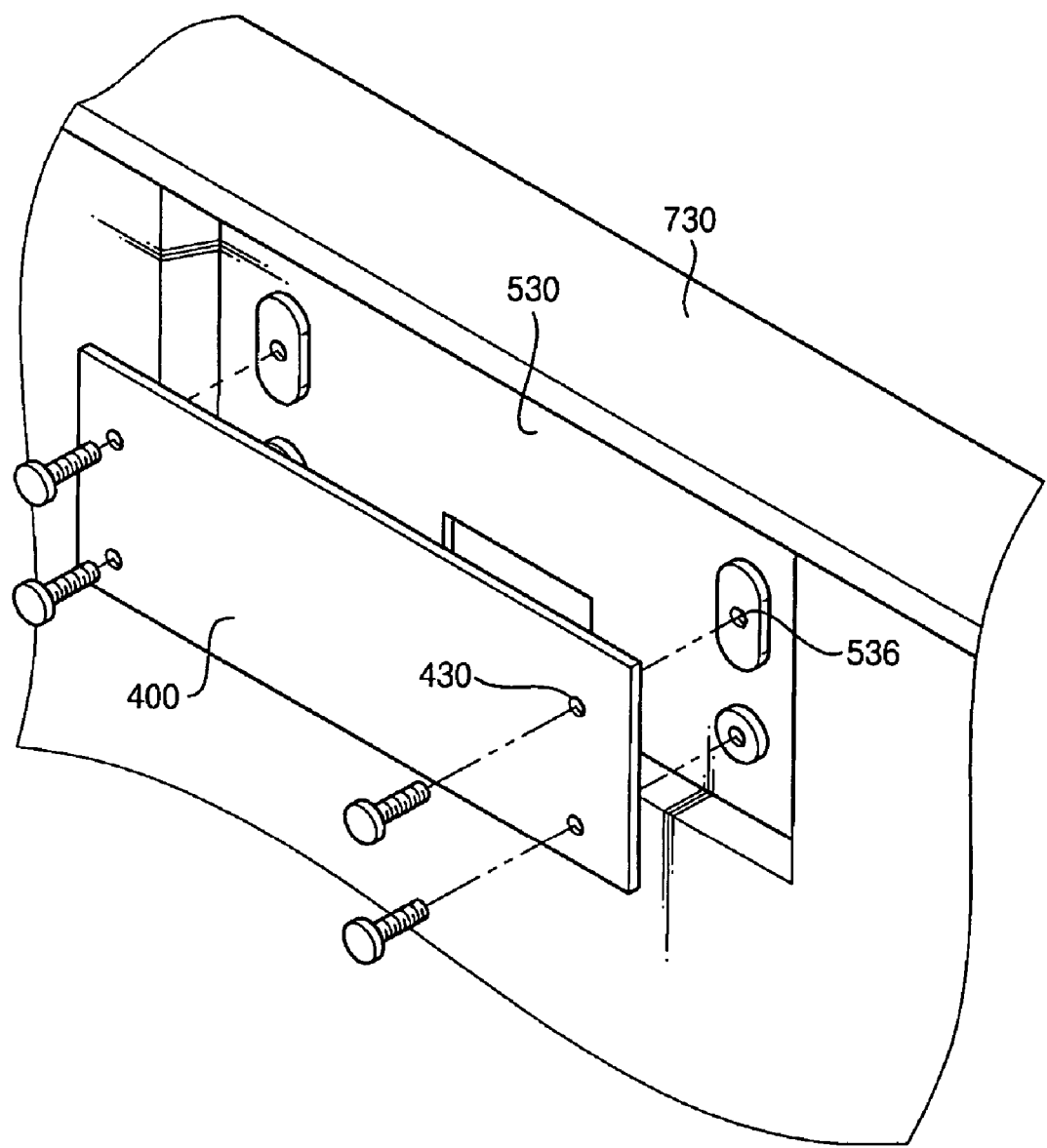
FIG. 4 is an exploded perspective view illustrating a combination between a control printed circuit board and a bottom chassis according to an embodiment of the present invention.

FIG. 3 is an enlarged view illustrating a portion of circuit board receiving recess in FIG. 2. FIG. 4 is an exploded perspective view illustrating a combination between a control printed circuit board and a bottom chassis.

Referring to FIGS. 1-4, the control PCB 400 is received by the circuit board receiving recess 530 formed at the bottom plate 510 of the bottom chassis 500.

The control PCB 400 outputs various control signals for controlling the display unit 300 in response to various signals provided by an external main board (not shown). The control PCB 400 includes electric elements such as, for example, a timing controller or a memory.

The control PCB 400 includes the first connector 410 for an electric connection with the source PCB 320. The control PCB 400 further includes the second connector 420 for an electric connection with an external main board.

The control PCB 400 is combined with the circuit board receiving recess 530 so that a surface of the control PCB 400, where the first and second connectors 410 and 420 are formed, faces the circuit board receiving recess 530.

The circuit board receiving recess 530 is disposed at the bottom plate 510 of the bottom chassis 500 such that the circuit board receiving recess 530 is adjacent to the sidewall 520 where the source PCB 320 is disposed. The circuit board receiving recess 530 extends from an outer face of the bottom plate 510 of the bottom chassis 500 to provide a receiving space for receiving the control PCB 400. In other words, a portion of the bottom plate 510 is recessed to form the circuit board receiving recess 530.

The circuit board receiving recess 530 includes a first opening portion 532 exposing the first connector 410. The flexible circuit film 350 electrically connected to the source PCB 320 is electrically connected to the first connector 410 through the first opening portion 532.

The circuit board receiving recess 530 further includes a second opening portion 534 exposing the second connector 420. The flexible circuit film (not shown) electrically connected to the external main board (not shown) is electrically connected to the second connector 420 through the second opening portion 534.

The control PCB 400 is fastened to the circuit board receiving recess 530 through a screw connection. For a screw connection between the control PCB 400 and the circuit board receiving recess 530, the circuit board receiving recess 530 includes holes 536, and the control PCB 400 includes through-holes 430.

Figure 5:
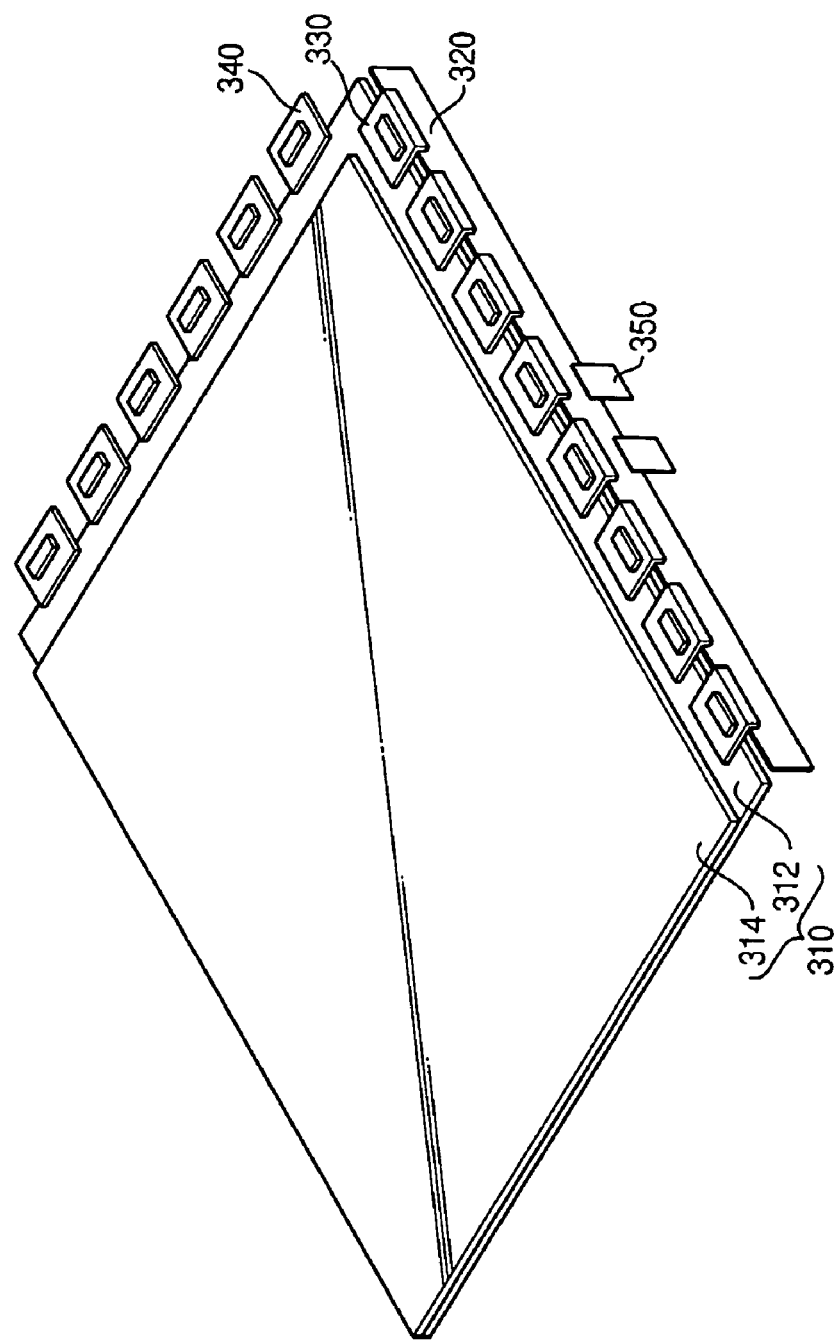
FIG. 5 is a perspective view illustrating a display unit according to an embodiment of the present invention.

FIG. 5 is a perspective view illustrating a display unit according to an embodiment of the present invention.

Referring to FIGS. 1 and 5, a display unit 300 includes a display panel 310 disposed over the light providing unit 200 to display an image, and a source PCB 320 for driving the display panel 310. The display panel 310 includes a first substrate 312, a second substrate 314 combined with the first substrate 312 such that the first and second substrates 312 and 314 face with each other, and a liquid crystal layer (not shown) disposed between the first and second substrates 312 and 314.

The first substrate 312 corresponds to a thin film transistor (TFT) substrate (not shown) having a plurality of TFTs arranged in a matrix. Each of the TFTs includes a source electrode electrically connected to a data line, a gate electrode electrically connected to a gate line, and a drain electrode electrically connected to a pixel electrode. The pixel electrode includes an optically transparent and electrically conductive material.

The second substrate 314 corresponds to a color filter substrate having RGB color filters arranged in a matrix. The second substrate 314 may include a common electrode. The common electrode may include an optically transparent and electrically conductive material.

When a gate voltage is applied to the gate electrode of the TFT, electric fields are generated between the pixel electrode and the common electrode. When electric fields are generated between the pixel electrode and the common electrode, an arrangement of liquid crystal molecules of the liquid crystal layer is altered to change an optical transmittance by pixel to display an image.

The source PCB 320 outputs driving signals for driving the display panel 310 in response to the control signal provided by the control PCB 400.

The display unit 300 further includes the data driving circuit film 330 connecting the source PCB 320 to the display panel 310, and a gate driving circuit film 340 connected to the display panel 310. The data driving circuit film 330 is electrically connected to the data line of the first substrate 312, and the gate driving circuit film 340 is electrically connected to the gate line of the first substrate 312. The data driving circuit film 330 and the gate driving circuit film 340 may correspond to, for example, a tape carrier package (TCP) or a chip on film (COF).

A portion of the data driving circuit film 330 can be bent such that the source PCB 320 can be disposed at the sidewalls 520 of the bottom chassis 500.

The source PCB 320 is connected to the flexible circuit film 350 to be connected to the control PCB 400. In an embodiment of the present invention, the flexible circuit film 350 is electrically connected to the first connector 410 of the control PCB 400 as shown in FIG. 2. Therefore, control signals generated by the control PCB 400 is transferred to the source PCB 320 through the flexible circuit film 350.

Referring to FIGS. 1 to 4, the control PCB 400 is disposed at the circuit board receiving recess 530 along a downward direction. The bottom chassis 500 includes the bottom plate 510 supporting the light providing unit 200, and the sidewalls 520 facing the side portion of the light-providing unit 200. The circuit board receiving recess 530 is formed at the bottom plate 510.

The control PCB 400 can be combined with the circuit board receiving recess 530 through, for example, a screw. For a screw connection between the control PCB 400 and the circuit board receiving recess 530, the circuit board receiving recess 530 includes the holes 536, and the control PCB 400 includes the through-holes 430.

Then, the light-providing unit 200 is disposed in the receiving space defined by the bottom plate 510 and the sidewalls 520 of the bottom chassis 500. In an embodiment of the present invention, the light reflecting plate 230, the lamps 210, the light diffusing plate 222 and the optical sheet 224 can be sequentially disposed in the receiving space.

The light reflecting plate 230 is disposed on the bottom plate 510 of the bottom chassis 500 to cover the circuit board receiving recess 530. Therefore, the light reflecting plate 230 prevents foreign substances from inflowing through an opening portion.

Prior to disposing the light diffusing plate 222, the side molds 710 may be disposed so that the side molds 710 cover the first and second end portions of the lamps 210, respectively. The side molds 710 fixes the lamp holders 212 and covers the first and second end portions of the lamps 210 to prevent the first and second end portions of the lamps from being exposed outside the display apparatus. The side molds 710 supports the optical members 220 disposed over the optical members 220 and guides the optical members 220 to a proper position.

Then, the mold frame 720 is combined with the bottom chassis 500 to fasten the optical member 220 to the bottom chassis 500. The mold frame 720 compresses edge portions of the light diffusing plate 222 and the optical sheet 224. The mold frame 720 is combined with the sidewalls 520 of the bottom chassis 500.

Then, the display unit 300 is disposed over the light-providing unit 200. The display unit 300 includes a display panel 310 disposed over the light-providing unit 200 to display an image, and a source PCB 320 that drives the display panel 310. The display panel 310 is supported and fixed by the mold frame 720, and the data driving circuit film 330 is bent so that the source PCB 320 is disposed at a side of the mold frame 720 and the bottom chassis 500.

Then, the top chassis 730 is combined with the bottom chassis 500 to fasten the display unit 300 to the bottom chassis 500. The top chassis 730 is combined with the bottom chassis 500 to fix the display panel 310, and covers the source PCB 320 disposed at the side of the mold frame 720 and the bottom chassis 500.

Referring to FIGS. 2 and 3, the flexible circuit film 350 electrically connected to the source PCB 330 is connected to the control PCB 400.

The control PCB 400 includes the first connector 410 and the second connector 420. The control PCB 400 is electrically connected to the flexible circuit film 350 through the first connector 410, and the control PCB 400 is electrically connected to the main board (not shown) through the second connector 420. The circuit board receiving recess 530 includes the first opening portion 532 exposing the first connector 410, and the second opening portion 534 exposing the second connector 420.

The flexible circuit film 350 is electrically connected to the first connector 410 through the first opening portion 532. Another flexible circuit film electrically connected to an external main board may be electrically connected to the second connector 420 through the second opening portion 534.

The inverter board 600 generating a driving voltage for driving the lamps 210 is disposed at the back face of the bottom chassis 500. Two inverter boards 600 are disposed at a first end portion of the bottom chassis 500, which corresponds to a first end portion of the lamps 210, and a second end portion of the bottom chassis 500, which corresponds to a second end portion of the lamps 210. The inverter boards 600 are electrically connected to the first and second end portions of the lamps 210 to apply a driving voltage to the lamps 210. Alternatively, a single inverter board 600 may be disposed at the first end portion of the bottom chassis 500.

Then, the shield case 610 is combined with the bottom chassis 500 so that the shield case 610 covers the inverter board 600. The shield case 610 protects the inverter board 600, and electrically shields the inverter board 600. In other words, the shield case 610 blocks an electromagnetic field generated from the inverter board 600.

According to an embodiment of the present invention, the circuit board receiving recess is integrally formed with the bottom chassis to simplify an assembling process and enhance assemblage convenience.

An additional shield case and a gasket are not required such that manufacturing costs can be lowered.

Although exemplary embodiments of the present invention have been described with reference to the accompanying drawings, it is to be understood that the present invention should not be limited to these precise embodiments but various changes and modifications can be made by one skilled in the art without departing from the spirit and scope of the present invention as hereinafter claimed.

What is claimed is:

1. A display apparatus comprising:
 a light-providing unit generating light;
 a display unit displaying an image using the light generated by the light-providing unit;
 a driving unit driving at least one of the light-providing unit and the display unit; and
 a bottom chassis receiving the light providing unit, the bottom chassis having a driving unit receiving recess that receives the driving unit,
 wherein the bottom chassis comprises:
 a bottom plate; and
 sidewalls extending from the bottom plate and facing side portions of the light-providing unit, wherein the driving unit receiving recess is formed at the bottom plate.

2. The display apparatus of claim 1, wherein a portion of the bottom plate is recessed to form the driving unit receiving recess.

3. The display apparatus of claim 2, wherein the driving unit corresponds to a control printed circuit board outputting a control signal controlling the display unit, and comprising a first connector electrically connecting the driving unit to the display unit.

4. The display apparatus of claim 3, wherein the driving unit receiving recess has a first opening portion exposing the first connector.

5. The display apparatus of claim 3, wherein the control printed circuit board comprises a second connector electrically connecting the driving unit to an external main board.

6. The display apparatus of claim 5, wherein the driving unit receiving recess has a second opening portion exposing the second connector.

7. The display apparatus of claim 2, wherein the driving unit receiving recess has a hole through which the driving unit is combined with a screw.

8. The display apparatus of claim 1, wherein the display unit comprises: a display panel disposed over the light providing unit to display an image; and a source printed circuit board driving the display panel.

9. The display apparatus of claim 8, wherein the source printed circuit board is disposed at the sidewalls of the bottom chassis.

10. The display apparatus of claim 1, wherein the light-providing unit comprises:
 a plurality of lamps arranged in parallel with each other on the bottom plate of the bottom chassis;
 an optical member disposed over the lamps; and
 a light reflecting plate disposed under the lamps.

11. The display apparatus of claim 10, where the driving unit corresponds to an inverter board that provides the lamps with driving voltages, the inverter board being disposed on a back face of the bottom plate.

12. The display apparatus of claim 1, wherein the driving unit comprises a control printed circuit board outputting a control signal controlling the display unit, and an inverter board that provides the lamps with driving voltages, the inverter board being disposed on a back face of the bottom plate.

13. The display apparatus of claim 1, further comprising a top chassis combining sidewalls of the bottom chassis to fasten the display unit to the bottom chassis.

14. A method of manufacturing a display apparatus, comprising:
 combining a driving unit with a driving unit receiving recess of a bottom chassis;
 disposing a light-providing unit in a receiving space of the bottom chassis;
 disposing a display unit over the light providing unit; and
 combining a top chassis with the bottom chassis to fasten the display unit to the bottom chassis,
 wherein the bottom chassis comprises:
 a bottom plate; and
 sidewalls extending from the bottom plate and facing side portions of the light-providing unit, and
 a portion of the bottom plate is recessed to form the driving unit receiving recess.

15. The method of claim 14, wherein the driving unit comprises:
 a first connector electrically connecting the driving unit to the display unit; and
 a second connector electrically connecting the driving unit to an external main board.

16. The method of claim 15, wherein the driving unit receiving recess comprises a first opening portion exposing the first connector, and a second opening portion exposing the second connector.

17. The method of claim 16, wherein the display unit comprises:
 a display panel disposed over the light providing unit to display an image; and
 a source printed circuit board driving the display panel, the source printed circuit board being disposed at the sidewalls of the bottom chassis.

18. The method of claim 17, further comprising connecting a flexible circuit board electrically connected to the source printed circuit board to the first connector through the first opening portion.

19. The method of claim 14, further comprising combining an inverter board with the bottom chassis at a bakside of the bottom chassis.

* * * * *